United States Patent
Peter

(10) Patent No.: US 6,484,627 B1
(45) Date of Patent: Nov. 26, 2002

(54) SKEWER ASSEMBLY FOR SUPPORTING A BONELESS CUT OF MEAT ON A SPIRAL MEAT SLICER

(75) Inventor: Don Peter, Hutchinson, KS (US)

(73) Assignee: Doskocil Food Service Company, L.L.C., Oklahoma City, OK (US)

(*) Notice: Subject to any disclaimer, the term of this patent is extended or adjusted under 35 U.S.C. 154(b) by 0 days.

(21) Appl. No.: 09/777,119

(22) Filed: Feb. 6, 2001

(51) Int. Cl.[7] .............................. A23L 1/00; A23L 1/31; A23N 7/00; A47J 17/00
(52) U.S. Cl. .................. 99/538; 99/419; 99/421 V; 99/593
(58) Field of Search ................. 99/537, 419–421 V, 99/538, 541, 593, 594, 597, 598, 599; 83/483, 488, 932; 426/513, 518

(56) References Cited

U.S. PATENT DOCUMENTS

| | | | |
|---|---|---|---|
| 1,345,376 A | 7/1920 | Leonard | |
| 1,472,219 A | 10/1923 | Hoffman | |
| 1,485,253 A | * 2/1924 | Devlin | ..................... 99/419 X |
| 4,056,026 A | 11/1977 | Panaritis et al. | ............... 83/454 |
| 4,126,086 A | 11/1978 | Valade | .......................... 99/419 |
| 4,170,174 A | * 10/1979 | Ditty et al. | ................... 99/538 |
| 4,176,592 A | 12/1979 | Doyle, Jr. | ..................... 99/419 |
| 4,287,820 A | * 9/1981 | Urban | .......................... 99/538 |
| 4,412,483 A | 11/1983 | Hoegh | .......................... 99/538 |
| 4,441,411 A | 4/1984 | Mullins, Jr. | ................... 99/538 |
| 5,251,543 A | 10/1993 | Brothers | ....................... 99/538 |
| 6,269,740 B2 | * 8/2001 | Kojs | ............................. 99/537 |

* cited by examiner

Primary Examiner—Timothy F. Simone
(74) Attorney, Agent, or Firm—McAfee & Taft

(57) ABSTRACT

A skewer assembly for use with a spiral meat slicing apparatus. The skewer assembly includes a base and a skewer connected thereto and extending therefrom. The skewer has an upper end, a lower end and a body portion therebetween. The body portion has a length and has a slot defined therethrough for at least a portion of the length of the body portion. The skewer may be inserted through a boneless cut of meat and the skewer assembly along with the meat product may be placed on a spiral meat slicing apparatus. Once the boneless cut of meat has been spiral sliced, the skewer assembly along with the meat product can be removed from the meat slicing apparatus. Prior to removing the skewer from the meat product, a knife can be inserted into the slot and can be moved along the slot to cut the meat product into two approximate halves through the portion of the meat which was not sliced by the circular slicing apparatus. Each half will have an unsliced portion that will hold the slices in the half of the meat product together.

16 Claims, 5 Drawing Sheets

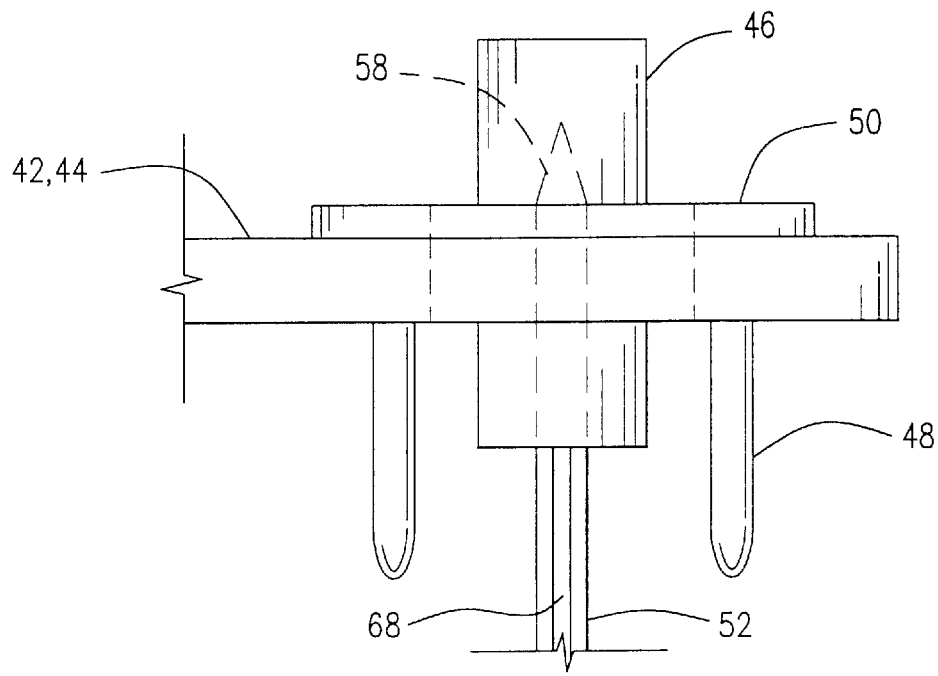
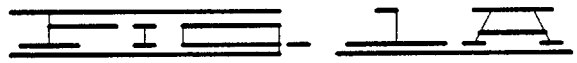
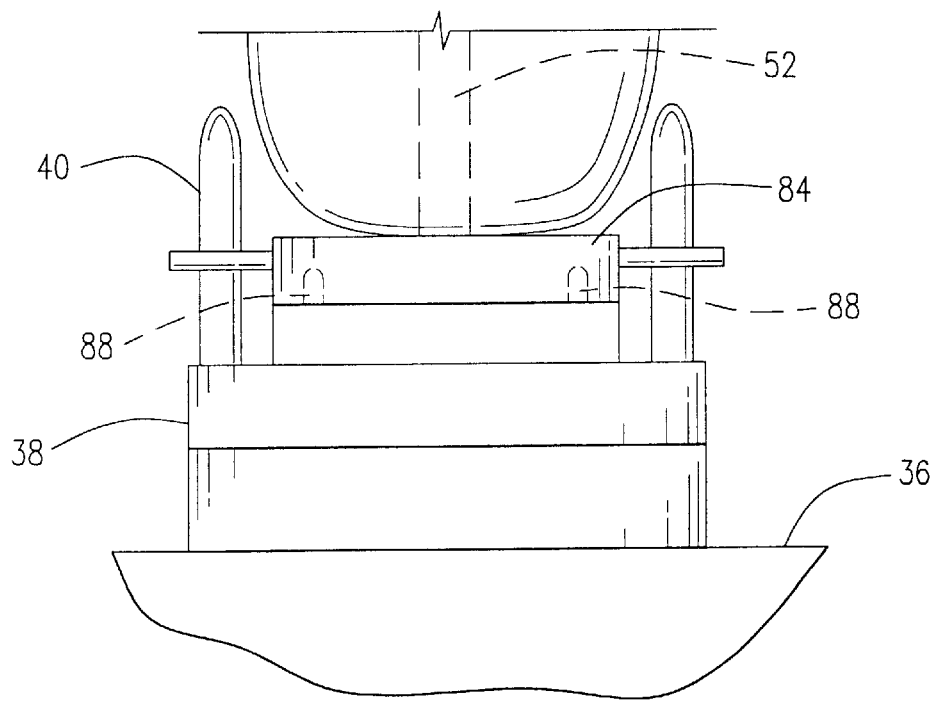

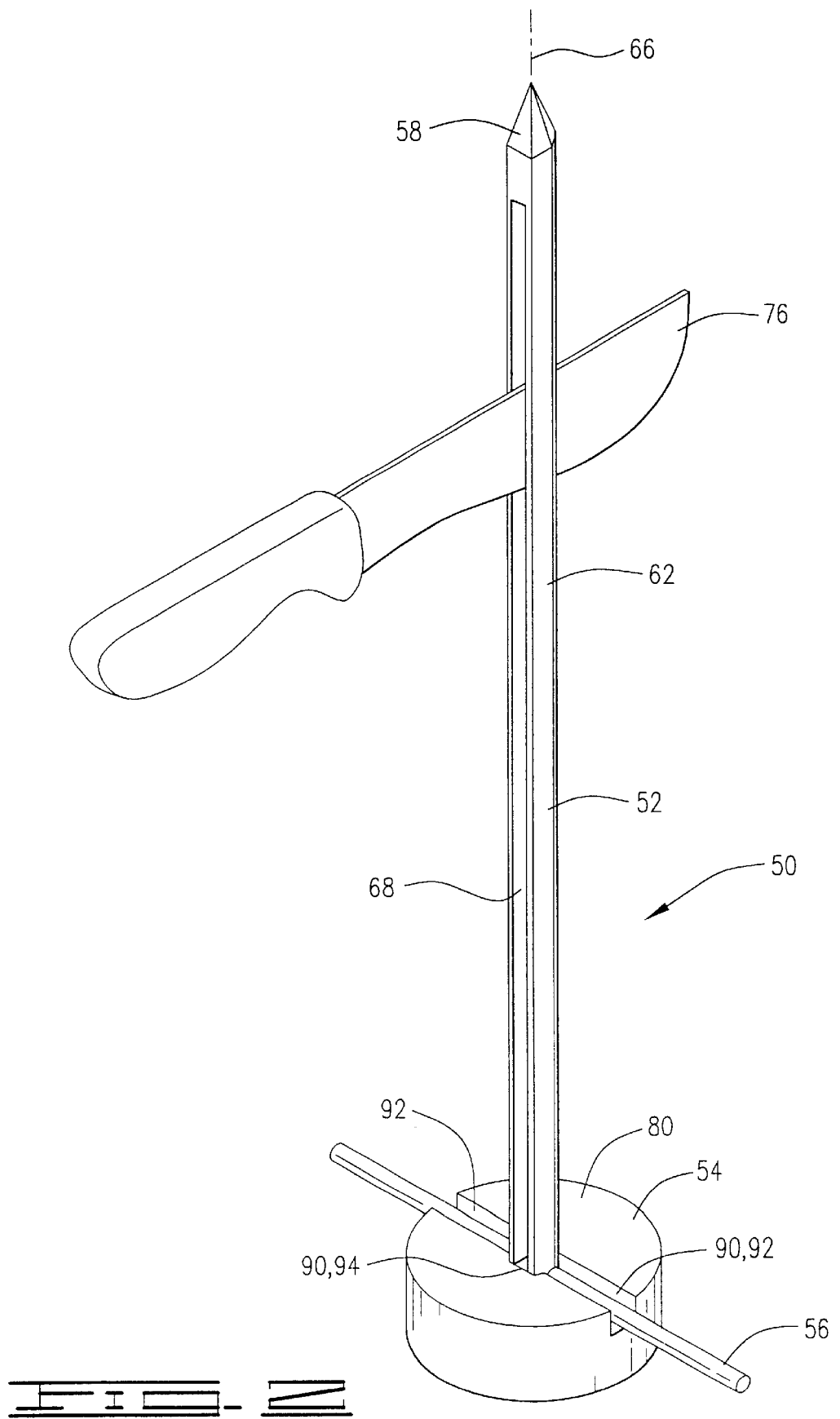

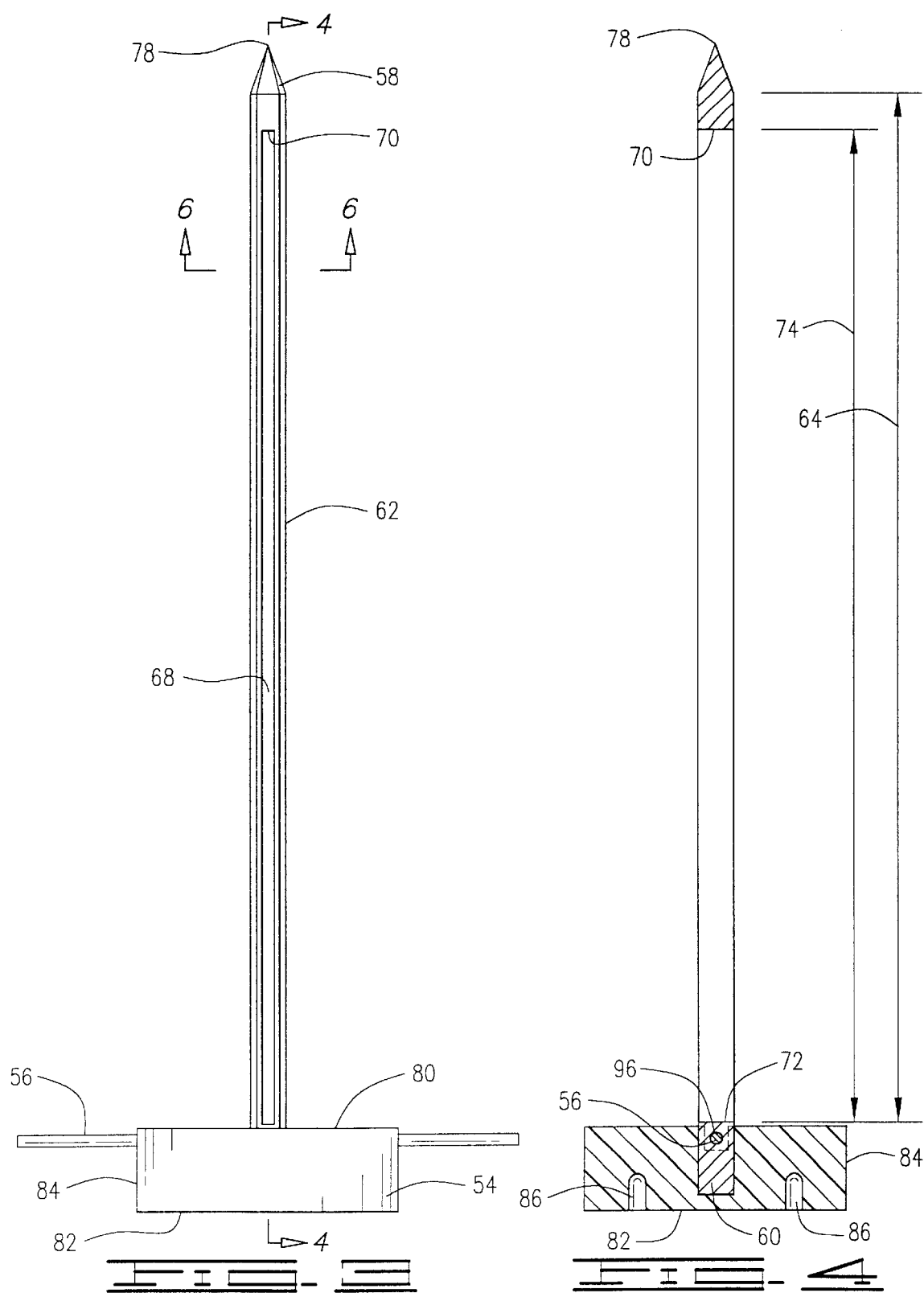

SKEWER ASSEMBLY FOR SUPPORTING A BONELESS CUT OF MEAT ON A SPIRAL MEAT SLICER

BACKGROUND OF THE INVENTION

The present invention relates to an apparatus for slicing a boneless cut of meat. More specifically, the invention relates to a skewer used to support a boneless cut of meat on a spiral meat slicer. The skewer has a slot therethrough which allows the meat product to be cut with a knife or other cutting blade while the skewer is inserted into the meat.

There are a number of devices available for spiral slicing boneless cuts of meat. U.S. Pat. Nos. 4,821,635 and 5,030,472 to Logan, Jr. et al., issued in April of 1989, and July of 1991, respectively, both of which are incorporated herein by reference disclose meat slicing apparatus for spiral slicing boneless cuts of meat. The Logan patents disclose a meat slicing apparatus that includes a meat spit between and upper and lower chucks to support the boneless cut of meat. When the meat rotates, the slicing blade is moved into slicing engagement with the meat. The blade moves vertically as the meat rotates to create the spiral slice. When slicing is complete, a central uncut core will remain around the spit. The central core allows the spiral sliced meat product to hold its shape and prevents the slices from separating from one another.

Another spiral slicing apparatus is shown in U.S. Pat. No. 5,251,543 to Brothers, issued Oct. 12, 1993, the details of which are incorporated herein by reference. That patent discloses a spiral slicing means that has an accessory adapted to be utilized with various spiral slicing machines. The accessory essentially comprises a skewer having a base and a movable stop member.

Although the apparatus in the aforementioned patents work well, it is sometimes desirable to cut the spiral sliced meat product into two separate halves. When doing so, it is desirable to cut the product into halves through the uncut center core so that the slices in each half will not separate from one another, and each half will maintain an aesthetically pleasing shape. None of the known apparatus disclose a method by which it can be insured that the sliced meat product can be cut precisely through the center core so that each half will have an uncut portion that holds the slices together and allows each half to maintain its shape. The present invention solves that problem.

SUMMARY OF THE INVENTION

The present invention is directed to a skewer apparatus which can be utilized with a wide variety of spiral meat slicers. The invention provides a method and apparatus for cutting a spiral sliced meat product into halves and insuring that the meat product is cut through the unsliced center core that will exist after the product has been spiral sliced.

The invention includes a skewer assembly comprised of a base and a skewer connected to and extending from the base. The skewer has a lower end portion, a body portion and an upper end portion. The upper end portion is preferably tapered to a point so that it can be easily inserted into a boneless meat product. The lower end is received and is connected to the base. The body portion has a length, and has a slot disposed therethrough for at least a portion of the length of the body portion. The slot is adapted to receive a knife or other cutting blade.

The operation of the invention simply comprises inserting an end of the skewer into a lower end of the meat product until the upper end portion of the skewer is exposed through the upper end of the meat product. The skewer must be inserted such that a portion of the slot is exposed at an end thereof, and preferably at the upper end of the meat product. The skewer assembly can then be placed on a spiral meat slicing apparatus. Once the boneless meat product is sliced, it can be removed from the apparatus and a knife or other cutting blade can be inserted into the exposed portion of the slot while the skewer is still inserted in the meat product. The knife can be moved along the length of the slot so that it will cut the meat product into halves. The cut will be through the unsliced center portion of the meat product since the cut will be made by the knife through the skewer. This insures that the two halves of the meat product will have an uncut portion which will hold the slices in each half together to provide not only for an aesthetically pleasing appearance but also for easier packaging.

BRIEF DESCRIPTION OF THE DRAWINGS

FIG. 1A schematically shows a side view of the upper support of the spiral meat slicing apparatus.

FIG. 1B schematically shows a side view of the lower support of the meat slicing apparatus.

FIG. 2 is a perspective view of the skewer assembly of the present invention.

FIG. 3 shows a view of a side of the skewer assembly of the present invention.

FIG. 4 is a section view from line 4—4 of FIG. 3.

FIG. 5 is a top view of the skewer assembly of the present invention.

FIG. 6 is a section view taken from line 6—6 of FIG. 3.

DETAILED DESCRIPTION OF A PREFERRED EMBODIMENT

Figure 1:
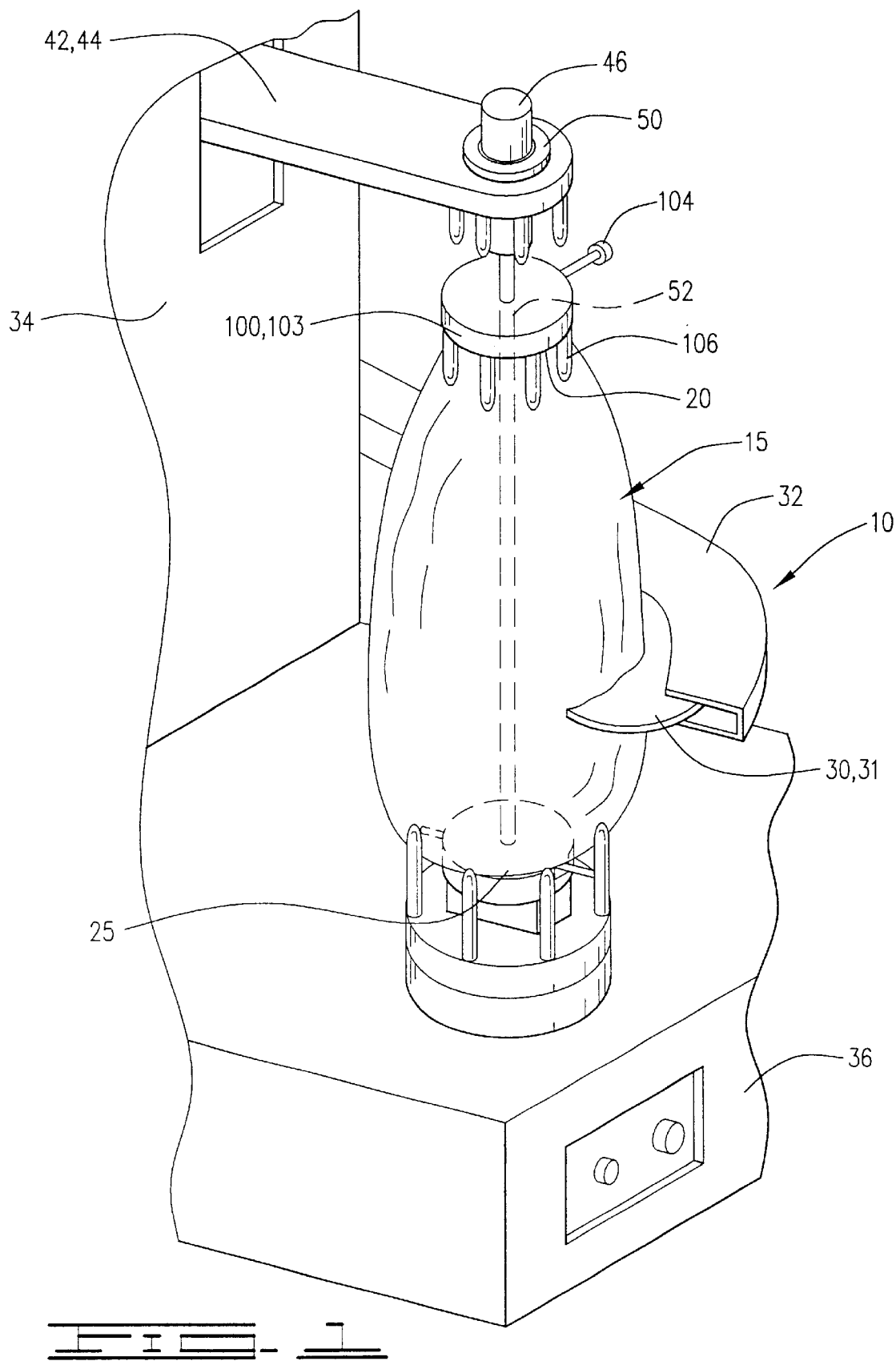
FIG. 1 schematically depicts a spiral meat slicing apparatus.
Figure 8:
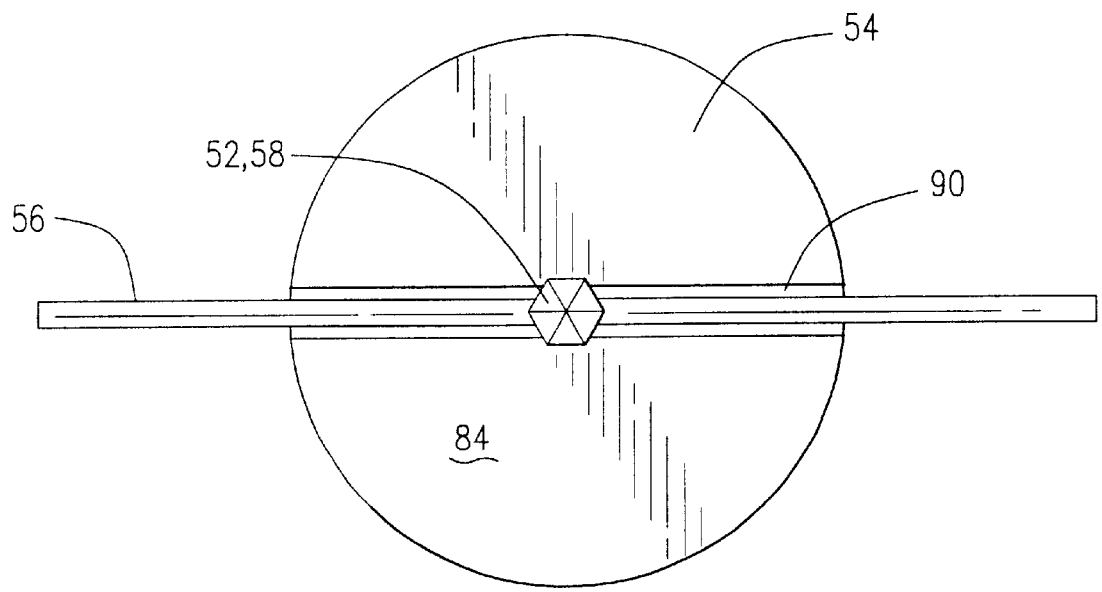
Figure 9:
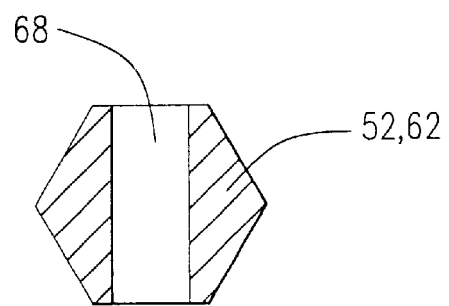

Referring now to the drawings and more specifically to FIG. 1, an apparatus 10 for spiral slicing a boneless cut of meat, or boneless meat product 15 is shown. Boneless meat product 15 has an upper end 20 and a lower end 25.

Apparatus 10 includes a saw or slicing blade 30, which is preferably a circular saw 30. Circular saw 30 may be a powered circular saw and thus has a saw drive mechanism (not shown) for rotating a saw blade 31. Saw 30 is attached to a movable arm or support 32 that is attached to a support housing 34. Arm 32 is movable vertically with respect to meat product 15.

Arm 32 will move automatically as saw 30 slices meat product 15, and has an arm drive mechanism for moving arm 32 (not shown). Apparatus 10 also includes a base 36. A rotatable lower support turntable 38 is supported by base 36. Apparatus 10 includes a turntable drive mechanism (not shown) for rotating turntable 38. Rotatable lower support 38 may include a plurality of upstanding prongs 40 which, as will be explained in more detail hereinbelow, may engage meat product 15 to support the meat product during rotation thereof. Apparatus 10 may also include an upper support 42 connected to housing 34. Upper support 42 may comprise a support arm 44 and a support tube 46. Arm 44 may have a plurality of downwardly extending prongs 48. Support tube 46 and prongs 48 may be attached to a rotatable element 50, which is disposed in arm 44, such that support tube 46 and prongs 48 are rotatable in arm 44. Arm 44 is movable vertically relative to housing 34.

Referring now to FIG. 2, a perspective view of the skewer assembly of the present invention is shown. Skewer assembly 50 includes a skewer 52 connected to a base 54. Skewer assembly 50 further includes a locking bar 56.

Skewer 52 has an upper end or upper end portion 58, a lower end or lower end portion 60 and a central or a body portion 62. Body portion 62 extends between upper and lower end portions 58 and 60 respectively. As is apparent from the drawings, body portion 62 has a cross-sectional shape comprising a polygon and preferably comprising a hexagon. Body portion 62 has a length 64.

Skewer 52 has a longitudinal axis 66. A slot 68 having an upper end 70, a lower end 72 and a length 74 is defined through skewer 52 and is adapted to receive a cutting blade such as a knife 76. Knife 76 can be moved along length 74 from the upper end 70 to the lower end 72 of slot 68. Upper end portion 58 of skewer 52 is tapered, and preferably is tapered to a point 78 which will allow easy insertion of the skewer into boneless meat product 15.

Base 54 is preferably a circular base having an upper surface 80, a lower surface 82 and outer periphery 84. Base 54 may have a plurality of openings 86 defined in the lower surface thereof. Openings 86 are positioned and sized to receive projections 88 which may extend upwardly from turntable 38 to connect skewer assembly 50 to turntable 38. Thus, when base 54 is positioned on turntable 38, skewer assembly 50 will rotate with turntable 38 which can be powered by any means known in the art.

A groove 90 is defined in the upper surface of base 54. Groove 90 has outer portions 92 and a central portion 94. Central portion 94 may be wider than outer portions 92. Lower or second end 60 of skewer 52 is received in groove 90 and preferably in central portion 94 of groove 90. An opening 96 is defined through skewer 52 at the lower end portion 60 thereof. Preferably, opening 96 is perpendicular to longitudinal axis 66 and slot 68. Locking bar 56 is received in opening 96 and groove 90. Locking bar 56 thus helps to translate the rotation of base 54, so that as turntable 38 rotates, base 54, locking bar 56 and skewer 62, which comprise skewer assembly 50 will all rotate.

Referring now back to FIG. 1, it will be seen that the upper end portion 58 of skewer 52 may be inserted into the lower end 25 of meat product 15. Lower end 25 of meat product 15 may rest on upper surface 80 of base 54 of the skewer assembly 50. Skewer 52 is inserted through meat product 15 until the upper end portion 58 thereof is pushed through meat product 15 so that upper end portion 58 is exposed above the upper end 20 of meat product 15. The slot 68 will also be exposed above the upper end 20 of meat product 15 so that knife 76 may be received therein while the skewer 52 is still positioned in meat product 15.

As is apparent from FIG. 1, upper end portion 58 of skewer 52 will be received and supported by upper support 42. In the apparatus schematically depicted in FIG. 1 and 1A, skewer 52 will be received in support tube 46 which as described above is rotatable in arm 42. In the embodiment shown, meat product 15 is of a size such that a secondary support 100 is utilized. Secondary support 100 has an opening for receiving upper end portion 58. Secondary support comprises a cap member 103 and has a threaded safety fastener 104 which can be threaded through cap member 103 to engage the skewer 62 and hold support 100 in place relative thereto. A plurality of prongs 106 extend downwardly from cap member 103 and engage meat product 15 such that as the skewer assembly is rotated by turntable 38, the meat product and secondary support 100 will rotate therewith. For meat products of a larger size, secondary support 100 is not necessary and the meat can be engaged by prongs 48 which will rotate with meat product 15.

Spiral slicing machines are well known in the art and the embodiment schematically depicted and described herein is only one of many apparatus with which the skewer assembly of the present invention can be utilized. The operation of the spiral slicing machine is well known and is generally as follows.

Skewer 52 is inserted into the lower end 25 of meat product 15. Skewer 52 is inserted completely through meat product 15 so that the upper end 58 of the skewer is exposed and so that a portion of slot 68 is exposed above the upper end 20 of meat product 15.

Arm 44 is raised so that skewer assembly 50, with meat product 15 thereon, may be placed on turntable 38. Base 54 is positioned so that projections 88 may be received in opening 86. Arm 44 is lowered so that skewer 52 is received in support tube 46. If necessary, a secondary support 100 may be utilized.

Circular saw 30 is positioned near the lower end 25 of the meat product 15. The drive mechanism utilized to drive circular saw 30 may then be actuated and the saw moved laterally into the side of the meat product until the desired depth of the cut has been reached. The turntable drive mechanism is then actuated so that the meat product begins rotating. As meat product 15 rotates, the drive mechanism for arm 32 will cause arm 32 to move upwardly so that a spiral slicing effect is achieved. The depth of cut will be such that an uncut central core of the boneless meat product will remain around skewer 52.

Once the spiral slicing is complete, arm 44 can be moved upwardly so that skewer assembly 50 can be lifted off of turntable 38. Cutting blade 76 can then be inserted into the exposed portion of the slot 68 above upper end 20 of meat product 15. Cutting blade 76 can be pushed downwardly through slot 68 until it reaches the lower end 72 thereof, to cut meat product 15 through the unsliced, or uncut central core of the boneless meat product.

After the meat product has been cut by blade 76, the result will be two approximate halves of meat product 15 each being spiral sliced by the circular saw, but each being held together by the unsliced central core which has been cut by knife 76 in the center thereof. This is a great improvement over the prior art methods of cutting spiral sliced meat products into half portions. Previously, it was necessary to approximate where the uncut central core was after the skewer or spit had been removed. If the uncut central core was even slightly missed, the result would be unconnected half slices of meat product that could not be held together and that would not maintain their shape for packaging and for the aesthetically pleasing appearance given by the meat product.

Thus, it is seen that the apparatus and methods of the present invention readily achieve the ends and advantages mentioned as well as those inherent therein. While certain preferred embodiments of the invention have been illustrated and described for purposes of the present disclosure, and numerous changes in the arrangement and construction of parts and steps may be made by those skilled in the art, which changes are encompassed within the scope and spirit of the present invention as defined by the appended claims.

What is claimed is:

1. A skewer for supporting a boneless cut of meat on a meat slicing apparatus, the skewer comprising:
   a first end portion;
   a second end portion; and
   a body portion extending between the first and second end portions, the body portion having a length and having a slot defined therethrough along at least a portion of the length of the body portion, a portion of the slot being exposed when the skewer is inserted in the boneless cut of meat to support the boneless cut of meat, wherein a cutting blade may be inserted in the exposed portion of the slot and moved along a length of the slot to cut the boneless cut of meat.

2. The skewer of claim 1, wherein said skewer has a cross-sectional shape comprising a polygon.

3. The skewer of claim 1, said cross-sectional shape comprising a hexagon.

4. The skewer of claim 1, further comprising a base attached to said second end portion.

5. The skewer of claim 4, said base being removably connectable to said meat slicing apparatus.

6. The skewer of claim 1, wherein said first end portion is tapered for insertion into said boneless meat product.

7. A skewer assembly for supporting a boneless cut of meat on a spiral meat slicer, the meat slicer having an upper support and a rotatable lower support, the skewer assembly comprising:

a skewer having an upper end and a lower end and having a body portion therebetween, said skewer being insertable through said cut of meat so that the upper end thereof is exposed; and a base connected to the lower end of said skewer, said base being adapted to be connected to said rotatable lower support and said upper end of said skewer being connectable to said upper support, said skewer having a slot defined therethrough, a portion of said slot being exposed when said skewer is inserted through said boneless cut of meat wherein a cutting blade may be received in said exposed portion of said slot and moved along a length of said slot to cut said boneless cut of meat prior to removing said skewer therefrom.

8. The apparatus of claim 7, said base comprising a circular base.

9. The apparatus of claim 7, said base defining a groove in the upper surface thereof for receiving said lower end of said skewer.

10. The apparatus of claim 9, further comprising a locking bar extending outwardly from said lower end of said skewer.

11. The apparatus of claim 10, wherein said groove extends across said upper surface of said base, said locking bar being received in an opening defined through said lower end of said skewer and being disposed in said groove.

12. A skewer insertable into a boneless cut of meat for supporting a boneless cut of meat, the skewer comprising:

a first end;

a second end, the first and second ends defining a length therebetween; and a slot defined in the skewer extending for at least a portion of the length between the first and second ends, the slot having an upper end and a lower end defining a slot length therebetween, wherein at least one of the upper and lower ends of the slot is exposed after the skewer is inserted into the boneless cut of meat, so that a cutting blade may be inserted into the exposed portion of the slot and moved along the slot to cut the boneless cut of meat.

13. The skewer of claim 12, wherein both of the first and second ends of the slot are exposed when the skewer is inserted in the boneless meat product.

14. The skewer of claim 12 further comprising a base connected to the second end of the skewer, the base adapted to be connected to a spiral meat slicing apparatus.

15. The skewer of claim 12, wherein the first end of the skewer is tapered.

16. The skewer of claim 12, wherein the skewer will support a boneless cut of meat on a spiral meat slicing apparatus.

* * * * *